Aug. 7, 1951 J. D. ROBERTSON 2,562,949
EXPANDER AND CONTRACTOR ROLL
Filed March 30, 1949
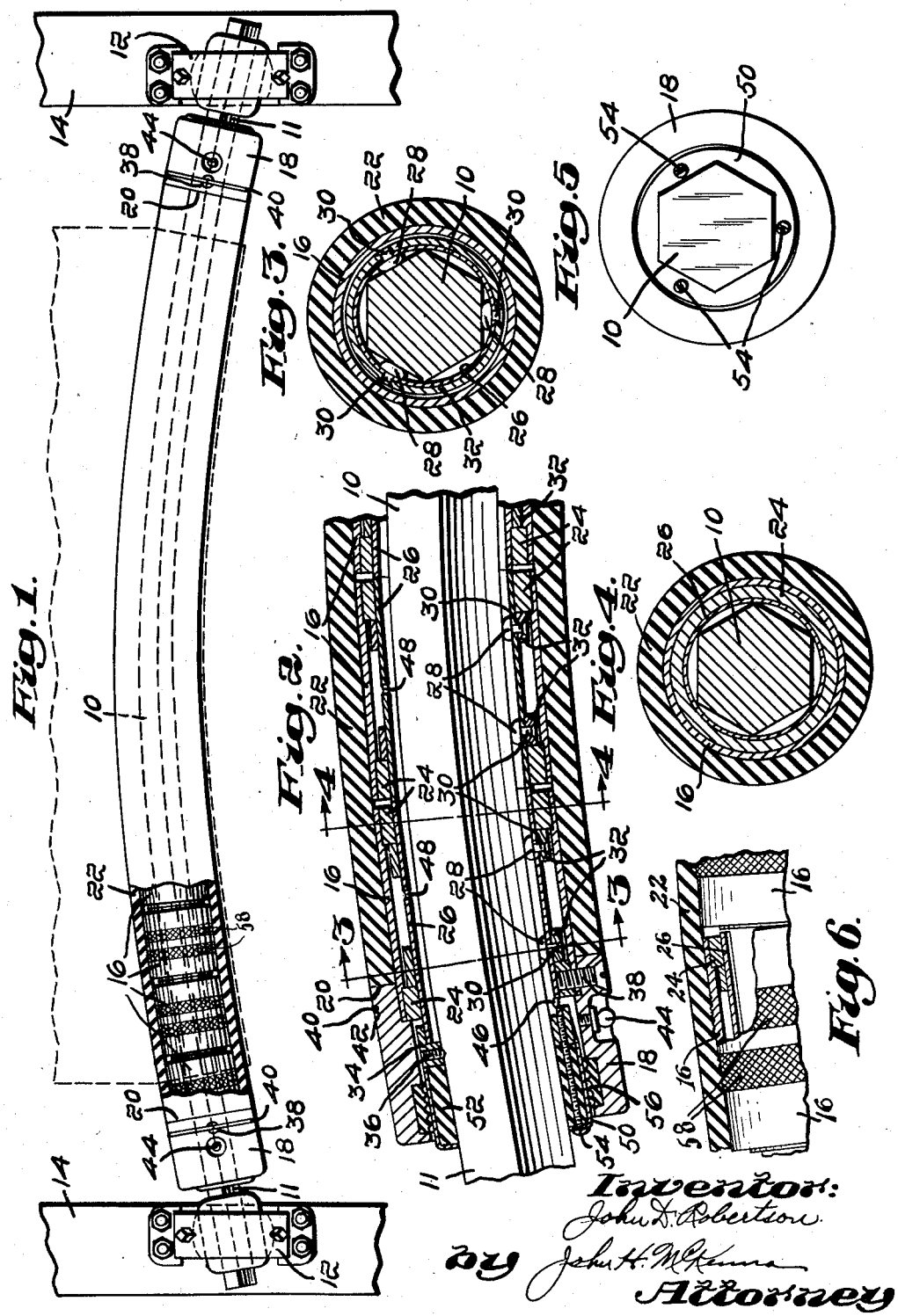
Inventor:
John D. Robertson
by John H. McKenna
Attorney Patented Aug. 7, 1951

2,562,949

UNITED STATES PATENT OFFICE 2,562,949

EXPANDER AND CONTRACTOR ROLL

John D. Robertson, Taunton, Mass.

Application March 30, 1949, Serial No. 84,449

5 Claims. (Cl. 26—63)

This invention relates to improvements in expander and contractor rolls for flexible sheet materials. More particularly it relates to rolls of the general type which have curved extent between end portions which are adapted to be adjustably clamped with the curved axis of the roll in any of various planes. Such rolls have utility for spreading travelling sheets of fabric, paper, foils, films and the like, and for eliminating wrinkles therein as the sheet comes to the roll at its concave side and leaves the roll at its convex side on a course leading to or from any of various processing devices. However, while the rolls are commonly referred to as expander rolls, they have utility also for contracting the width of travelling sheets, as in the manufacture of creped sheet materials, for example, in which case the sheet would come to the roll at its convex side and leave the roll at its concave side.

Curved rolls of the general type to which the invention relates ordinarily have a sheet engaging surface of resiliently flexible material, such as rubber, engaged elastically in tubular form over a series of roll sections which are rotatably mounted on a curved shaft whose opposite ends project into supporting clamps which conveniently may be mounted on the frame of any particular machine or device with which the roll is to be associated. Considering only the utility of such rolls as expanders, the travelling sheet comes to the expander roll at the inner side of its curved extent and leaves the roll at the outer side of its curved extent, the resilient surface portion of the roll expanding and contracting as the sheet or web rotates the roll about its curved axis, whereby the engaged sheet or web is spread or stretched laterally in passing around the roll from the inner concave side to the outer convex side thereof.

The more satisfactory varieties of such curved rolls heretofore have had ball bearing units associated with each of the series of roll sections within the resilient outer surface tube of the roll, to promote a proper rotation of the roll by the sheet or web without imposition of objectionable longitudinal strain on the goods, especially when extremely thin tissues, foils, films or delicate fabrics are being subjected to the action of a roll. The inner races of the ball bearing units are required to be specially machined to fit the curved shaft, and must be fixed against rotation on the shaft. In a preferred prior construction, the curved shaft has hexagonal cross-section and the inner races have hexagonal bores for fitting on the shaft. The multiple ball bearing units and the required special manufacturing procedures necessarily have made the ball bearing equipped curved rolls relatively expensive.

While various curved rolls without ball bearings have been proposed heretofore, none of them, so far as I am aware, has been satisfactorily effective because the friction incident to rotation of the rolls has been too great to be overcome by any but the heavier and more rugged sheet materials. Also, these prior plain bearing rolls have utilized roll section bearings wherein a cylindrical surface rides on a curved surface of the roll shaft, with initial spot or point contacts which gradually wear and spread. The grit resulting from the wear increases the friction and hastens deterioration, making requisite frequent replacement of the cylindrical bearing elements of the roll sections and of the curved axles or shafts.

It is among the objects of my present invention to provide an expander and contractor roll wherein a series of roll sections have cylindrical bearings on cylindrical journals which are non-rotatably mounted on a curved shaft, the roll sections and journals being restrained against appreciable longitudinal movement on the shaft by means fixed to the shaft at opposite end regions of the roll.

Another object is to provide a relatively inexpensive but durably efficient curved expander and contractor roll wherein a curved shaft has angular cross-section, and a multiplicity of cylindrical roll sections are individually mounted on cylindrical journal sleeves, with cylindrical bearing elements between the roll sections and journal sleeves and fixed to either a journal sleeve or a roll section and in anti-friction bearing contact with the sleeve or section to which it is not fixed, all of the journal sleeves having cylindrical bores loosely fitting on the curved shaft, with means interiorly of each journal sleeve coacting with a flat surface of the shaft to prevent relative rotation of the shaft and the journal sleeves.

A further object is to provide a curved expander and contractor roll wherein a resiliently flexible surface tube elastically engages over a series of cylindrical roll sections, and wherein each roll section has cylindrical anti-friction bearing on a cylindrical sleeve which is non-rotatably mounted on a curved shaft, with means at each end of the roll securing the roll sections in operative relation on the shaft and effecting a seal around the shaft at each end of the roll.

It is, moreover, my purpose and object generally to improve the structure and operative efficiency of curved expander and contractor rolls and especially such rolls which are composite of a series of plain bearing roll sections within a resiliently flexible surface tube or sleeve.

In the accompanying drawing:

Fig. 1 is an elevational view of a mounted expander and contractor roll embodying features of the invention, a fragment of the resiliently flexible surface tube or sleeeve being broken away;

Fig. 2 is a fragmentary medial cross-sectional view of one end portion of the roll of Fig. 1, on a larger scale;

Fig. 3 is a cross-sectional view on line 3—3 of Fig. 2;

Fig. 4 is a cross-sectional view on line 4—4 of Fig. 2;

Fig. 5 is an end elevation looking at either end of the roll of Figs. 1–4; and

Fig. 6 is a fragmentary detail view showing the knurled surface portions on the roll sections over which the elastic tube is engaged.

Referring to the drawing, the particular expander and contractor roll herein represented has a longitudinally curved shaft 10 having hexagonal cross-section, and the oposite end portions of the shaft are straight, as at 11, to facilitate mounting of the shaft in conventional end clamps 12 which are shown mounted on the supports 14. By loosening the clamps, the curved axis of the shaft may be set in any desired plane about a straight axis common to both end clamps 12.

According to the invention, the roll has a series of roll sections 16 in end to end relation, and the two endmost roll sections 16 have secured thereon the terminal members 18, each providing an annular shoulder at 20 for engaging opposite ends of a resiliently flexible surface tube or sleeve 22 which elastically engages over all of the roll sections and provides the working surface for the roll as well as tieing all of the roll sections together for rotation with the surface tube as a unit. Tube or sleeve 22 preferably will be of rubber although any other material having suitable resilience and flexibility, coupled with needed durability in service, may be employed in place of rubber.

It is a feature of the invention that the roll sections 16 are cylindrical tubes which may be of steel or other suitably rigid and strong material. In one practical embodiment of the invention, the roll sections are two and seven-eighths inches long, for example, although their length may be varied to suit particular conditions or preferences. An annular ring bearing bushing 24 is secured in each end of each roll section 16. Conveniently, the internal diameter of the sections 16 may be slightly greater at their ends, and the bearing bushings 24 have force fit in the ends of the sections although the particular manner of associating the bushings with the roll sections should be regarded as exemplary rather than restrictive. Preferably, however, the bushings will be of a porous nature and porous bronze bushings 24 are recommended.

Each roll section 16 is rotatably mounted on a cylindrical bearing sleeve 26 whose exterior diameter nicely fits the interior diameter of the bushings 24 on the roll section, so that the bushings are in running contact with the sleeve 26. Preferably, the sleeves 26 will be of stainless steel tubing and the interior diameter of the sleeves is slightly larger than the maximum cross-section of the curved shaft 10, so that the sleeves may be slipped on the shaft and shifted along it, as may be desired, notwithstanding the curvature of the shaft, but the sleeves are simply and effectively retained against rotation on shaft 10 by the flat heads 28 of the elements 30 which secure the abutment rings 32 on the sleeves 26. Elements 30 may be rivets or screws, they being herein shown as rivets. The rings 32 constitute annular abutments which coact with the bushings 24 to prevent relative axial travel of each roll section and its mounting sleeve 26, and the rivet heads 28, three rivets being shown, each coacts with an adjacent flat surface of shaft 10 to lock the sleeve and shaft against any appreciable relative rotation.

It will be obvious that each roll section 16 may be associated with its mounting sleeve 26 prior to arrangement of the roll section and sleeve on curved shaft 10. After all of the roll section-sleeve units have been assembled, the assembled units may be slipped on shaft 10 in succession until the desired number of units are distributed in end to end relation along the shaft, with the sleeves 26 in end to end contact at the concave side of the shaft and slightly spaced from each other at the convex side, due to the curvature of the shaft. Hence, all of the sleeves may be clamped together endwise on shaft 10 by means on each endmost sleeve 26. As herein shown in Fig. 2, each endmost sleeve 26 has a threaded extension at its outer end, and an annular member 34 is screwed on each threaded sleeve extension. Each member 34 has a hexagonal hole therein for nicely fitting on shaft 10, and one or more set screws 36 in each member 34 secures these members to shaft 10 with all of the sleeves 26 clamped endwise together.

When assembling the roll, the described endwise clamping of sleeves 26 will be done prior to mounting of the terminal members 18 on the endmost roll sections 16, these terminal members being arranged over the annular members 34 and being secured to the endmost roll sections by a plurality of screws 38 which preferably will be locked against accidental loosening by a spring wire 40 which snaps into annular groove 42 in each terminal member and into the screw slots of screws 38.

It is desirable to provide lubrication for the bearing bushings 24, and a grease fitting is represented at 44 in each terminal member 18. One or more holes 46 is provided in the threaded extensions of the endmost sleeves 26 for passage of grease into the space between shaft 10 and the sleeves, and one or more holes 48 disposed centrally along each sleeve permits grease to flow into the spaces between the sleeves and the roll sections whence it works its way into lubricating relation to the bushings 24. Grease is prevented from escaping at the ends of the roll by packing means comprising a stainless steel cup-shaped member 50 at each end of the roll which has a hexagonal hole in its bottom wall for fitting on shaft 10, and has packing material 52 within the cup and around shaft 10. Three long screws 54 secure each cup member 50 to the adjacent annular member 34, tightening of the screws squeezing the packing into sealing engagement around shaft 10. Any suitable packing material 56, such as "neoprene," may be employed to seal the roll ends against seepage of grease between the terminal members 18 and the cup-shaped members 50.

Ordinarily, one terminal member 18 will be secured at its end of the roll, after which the elastic tube 22 will be worked into place from the other end. The second terminal member 18 then will be mounted and secured. Tube 22 may be drawn over the assembled roll sections in any conventional or desired manner, to provide the working surface of the roll and to tie together all of the roll sections 16 for rotation in unison with the surface tube 22. The elastic grip of tube 22 on the roll sections, and the shoulders 20 on terminal members 18, avoid axial crawling of tube 22 in service, yet the tube is free to flex, expand and contract as it rotates about the curved shaft 10.

It has been a characteristic of curved rolls of the general type to which the invention relates that greatest surface wear of the surface tube 18 has occurred at the regions opposite the spaces between the ends of the roll sections. Actually, a surface groove becomes worn in the working surface at each of these regions after a relatively short period of service. This has been due in large part to localization of the regions of stretching of the surface tube to the narrow bands at and between the ends of adjacent roll sections. The portions of the tube elastically engaging the roll sections inward from their ends have been frictionally held against any appreciable stretching as the roll has rotated. I have discovered that by providing one or more knurled bands 58 around the surface of each roll section, at or near the center thereof, the rubber tube becomes anchored at the knurled regions and the portions outward from the knurled regions stretch when the roll rotates, thus considerably broadening the regions of stretching of the surface tube and substantially reducing the tendency to wear grooves in the rubber surface. The useful life of a surface tube 18 is thereby considerably prolonged. The knurled bands 58 are best seen in the detail showing of Fig. 6.

It is intended that the patent shall cover, by suitable expression in the appended claims, whatever features of patentable novelty exist in the invention disclosed.

I claim as my invention:

1. An expander and contractor roll for flexible sheet material, comprising a rigid longitudinally curved shaft, a series of cylindrical sleeves on the shaft in end to end relation, a cylindrical roll section mounted rotatably on each of said sleeves and having a substantial cylindrical bearing on its mounting sleeve, means maintaining each roll section and its mounting sleeve against relative axial movement, a projection interiorly of each sleeve coacting with the adjacent portion of the curved shaft to prevent relative rotation of the shaft and sleeve, means fixed to said shaft at opposite end portions of the roll maintaining all of said sleeves against axial travel along the curved shaft, and a flexible surface tube elastically engaged over all of said roll sections.

2. An expander and contractor roll for flexible sheet material, comprising a rigid longitudinally curved shaft having at least one flat surface portion extending from end to end thereof, a series of cylindrical sleeves on the shaft in end to end relation, a cylindrical roll section mounted rotatably on each of said sleeves and having a substantial cylindrical bearing on its mounting sleeve, a pair of annular ring elements secured in spaced relation between each roll section and its mounting sleeve for maintaining each roll section and its mounting sleeve against relative axial movement, there being a projection interiorly of each sleeve in coacting relation to the said flat surface portion of the curved shaft, whereby the shaft and sleeve are maintained against relative rotation, a flexible surface tube elastically engaged over all of said roll sections, and means fixed to said shaft at opposite end portions of the roll maintaining all of the sleeves against axial travel along the curved shaft, and maintaining said surface tube against axial travel.

3. An expander and contractor roll for flexible sheet material, comprising a rigid longitudinally curved shaft, a series of cylindrical sleeves on the shaft in end to end relation, a cylindrical roll section mounted rotatably on each of said sleeves and having a substantial cylindrical bearing on its mounting sleeve, annular means secured exteriorly on each said sleeve for maintaining each roll section and its mounting sleeve against relative axial movement, the securing means for said annular means including a projection interiorly of the sleeve coacting with the adjacent portion of the curved shaft to prevent relative rotation of the shaft and sleeve, means fixed to said shaft at opposite end portions of the roll maintaining all of said sleeves against axial travel along the curved shaft, a flexible surface tube elastically engaged over all of said roll sections, and means sealing each end of the roll around the curved shaft.

4. An expander and contractor roll for flexible sheet material, comprising a rigid longitudinally curved shaft having angular cross-section, a series of cylindrical sleeves on the shaft in end to end relation, a cylindrical roll section rotatably mounted on each of said sleeves, said roll sections having internal diameter substantially greater than the exterior diameter of the sleeves, a pair of cylindrical bearing bushings secured within the opposite ends of each roll section and in cylindrical bearing contact with the exterior surface of its mounting sleeve, a pair of abutment rings exteriorly of each said sleeve and in coacting relation to said bushings whereby each roll section and its mounting sleeve are maintained against relative axial movement, means interiorly of each said sleeve in coacting relation to a flat surface of said shaft whereby the shaft and sleeves are maintained against relative rotation, means at the opposite end portions of the roll for injecting lubricant between the shaft and sleeves, there being openings through the sleeves for passage of lubricant to said bearing bushings, means sealing the opposite ends of the roll against escape of lubricant, and an elastic surface tube engaged over all of the said roll sections.

5. An expander and contractor roll for flexible sheet material, comprising a rigid longitudinally curved shaft, a series of roll sections supported rotatably on said shaft in end to end relation, means at opposite ends of the roll securing the roll sections against axial travel along the shaft, an elastic surface tube elastically engaged over all of the roll sections, and means providing a roughened band in the surface of each roll section a substantial distance inward from the opposite ends of each roll section, said elastic surface tube being anchored against stretching at its regions in contact with said roughened bands and the regions between roughened bands being free to stretch as the surface tube and roll sections rotate about said curved shaft.

JOHN D. ROBERTSON.

REFERENCES CITED

The following references are of record in the file of this patent:

UNITED STATES PATENTS

| Number | Name | Date |
|---|---|---|
| 1,384,806 | Reed | July 19, 1921 |
| 1,668,994 | Weiss-Oeschger | May 8, 1928 |
| 2,373,876 | Cutler | Apr. 17, 1945 |
| 2,393,191 | Robertson | Jan. 15, 1946 |
| 2,415,864 | Birch | Feb. 18, 1947 |